United States Patent
Lv et al.

(10) Patent No.: US 12,517,261 B2
(45) Date of Patent: Jan. 6, 2026

(54) MODELING METHOD OF TROPOSPHERIC DELAY FOR ARID-AREAS INCLUDING SANDY, GOBI AND DESERT REGIONS BASED ON GNSS

(71) Applicants: THREE GORGES GROUP INDUSTRIAL DEVELOPMENT (BEIJING) CO., LTD, Beijing (CN); CHINA THREE GORGES CORPORATION, Wuhan (CN)

(72) Inventors: Tingyan Lv, Wuhan (CN); Jingliang Zhou, Wuhan (CN); Rui Zhang, Wuhan (CN); Rongmin Chen, Wuhan (CN); Jiaqi Liu, Wuhan (CN); Zhuoya Qi, Wuhan (CN)

(73) Assignees: THREE GORGES GROUP INDUSTRIAL DEVELOPMENT (BEIJING) CO., LTD, Beijing (CN); CHINA THREE GORGES CORPORATION, Wuhan (CN)

( * ) Notice: Subject to any disclaimer, the term of this patent is extended or adjusted under 35 U.S.C. 154(b) by 0 days.

(21) Appl. No.: 19/083,465

(22) Filed: Mar. 19, 2025

(65) Prior Publication Data
US 2025/0298146 A1     Sep. 25, 2025

(30) Foreign Application Priority Data
Mar. 22, 2024 (CN) .......................... 202410333297.7

(51) Int. Cl.
G01S 19/21     (2010.01)
(52) U.S. Cl.
CPC .................................. *G01S 19/21* (2013.01)
(58) Field of Classification Search
CPC .......................................................... G01S 19/21
See application file for complete search history.

(56) References Cited

U.S. PATENT DOCUMENTS

| | | | | |
|---|---|---|---|---|
| 5,675,081 A | * | 10/1997 | Solheim | ................... G01S 19/14 |
| | | | | 73/170.28 |
| 2007/0258485 A1 | * | 11/2007 | Kappi | ................... G01S 19/072 |
| | | | | 342/357.44 |

(Continued)

FOREIGN PATENT DOCUMENTS

| CN | 103323888 A | 9/2013 |
|---|---|---|
| CN | 108388900 A | 8/2018 |

(Continued)

OTHER PUBLICATIONS

Fei Yang, Establishment and assessment of a zenith wet delay (ZWD) augmentation model, GPS Solutions, 2021, pp. 1-11, vol. 25 No. 148.

*Primary Examiner* — Tung S Lau
(74) *Attorney, Agent, or Firm* — Bayramoglu Law Offices LLC

(57) ABSTRACT

The provided is a modeling method of tropospheric delay for arid-areas including sandy, gobi and desert regions based on GNSS. The modeling method incudes: obtaining a troposphere zenith hydrostatic delay ZHD and a troposphere zenith wet delay ZWD by utilizing a GPT-3 model, and summing to obtain a troposphere zenith total delay ZTD; inversely calculating the ZTD by utilizing a ground-based GNSS, obtaining a high-precision ZWD inversed by the GNSS by calculating a difference between the ZTD and the troposphere zenith hydrostatic delay ZHD obtained by a Saastamonien model, inversely calculating an atmospheric weighted average temperature $T'_m$ by utilizing an ERA5 data set, performing linear correction to obtain a corrected temperature $T_m^r$, and calculating a priori value $ZWD_0$ of the high-precision ZWD; and correcting the $ZWD_0$, and adding the corrected $ZWD_0$ with the ZHD to obtain a corrected value of the high-precision ZTD.

2 Claims, 1 Drawing Sheet

(56) References Cited

U.S. PATENT DOCUMENTS

| 2011/0187592 | A1* | 8/2011 | Kappi | G01S 19/072 |
| | | | | 342/357.42 |
| 2012/0092213 | A1* | 4/2012 | Chen | G01S 19/44 |
| | | | | 342/26 A |

FOREIGN PATENT DOCUMENTS

| CN | 111382507 A | 7/2020 | | |
| CN | 114297939 B | 9/2022 | | |
| CN | 115857057 A | 3/2023 | | |
| CN | 115907201 A | 4/2023 | | |
| CN | 116010767 A | 4/2023 | | |
| WO | WO 2007/129242 A2 * | 11/2007 | | G01S 19/072 |
| WO | 2016145723 A1 | 9/2016 | | |
| WO | 2021169318 A1 | 9/2021 | | |

* cited by examiner

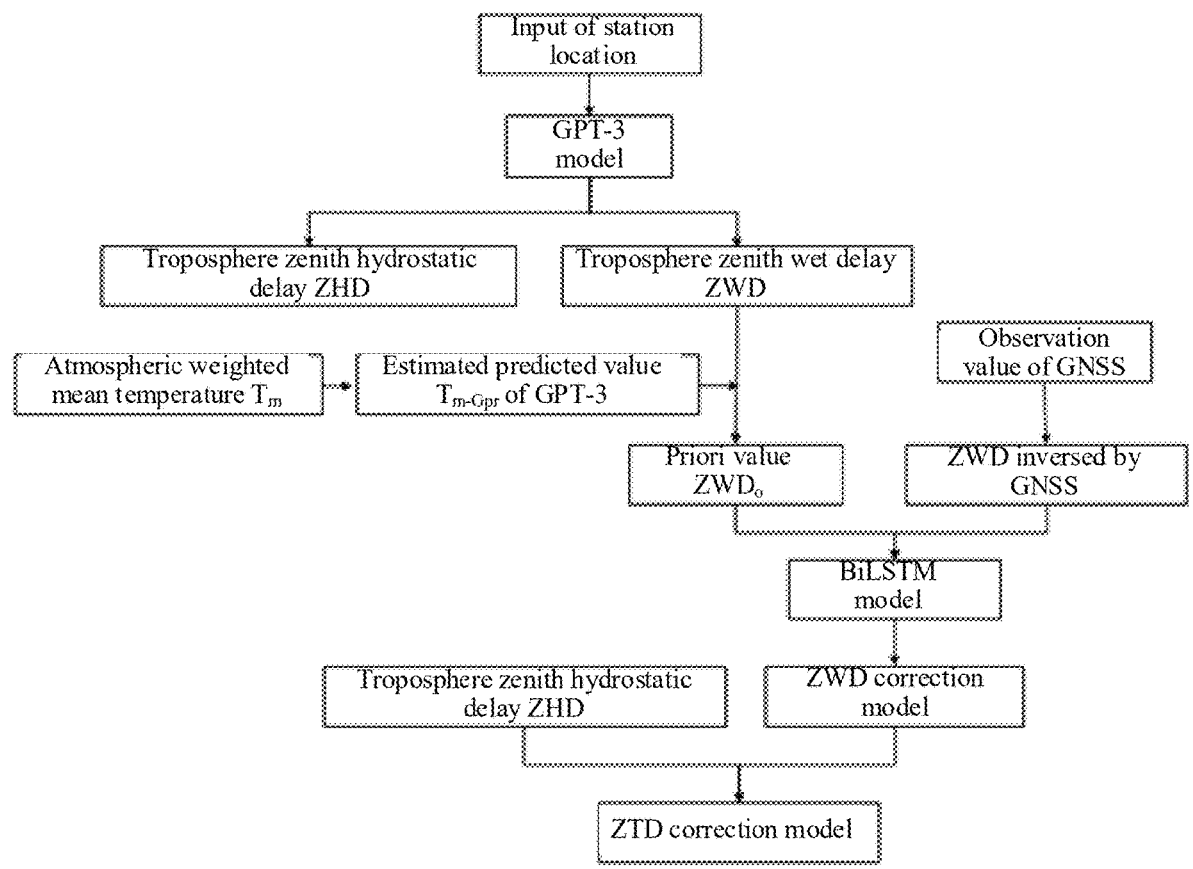

MODELING METHOD OF TROPOSPHERIC DELAY FOR ARID-AREAS INCLUDING SANDY, GOBI AND DESERT REGIONS BASED ON GNSS

CROSS-REFERENCE TO THE RELATED APPLICATIONS

This application is based upon and claims priority to Chinese Patent Application No. 202410333297.7, filed on Mar. 22, 2024, the entire contents of which are incorporated herein by reference.

TECHNICAL FIELD

The present disclosure belongs to the field of navigation and positioning, and particularly relates to a modeling method of tropospheric delay for arid-areas including sandy, gobi and desert regions based on GNSS.

BACKGROUND

Troposphere zenith total delay (ZTD) is a main error source in high-precision positioning of a global navigation satellite system (GNSS), and is also an important data source for studying a space environment of the GNSS. In GNSS positioning, the troposphere zenith total delay represents a delay from a receiving antenna to a satellite signal passing through the atmosphere. This delay is caused by water vapor, dry air, a temperature gradient and other factors in the atmosphere. Therefore, the troposphere zenith total delay will change under different meteorological conditions. Especially in the case of low elevation angle such as a cut-off angle of 5°, a total tilt delay can reach 20 m because the signal passes through more atmospheric thickness, which is a significant error source for high-precision positioning.

In order to achieve high-precision GNSS positioning, it is very important to establish an accurate troposphere delay correction model. These correction models need to consider a temperature, a humidity, a pressure and other factors in the atmosphere, and estimate the troposphere zenith total delay in combination with observation data of the GNSS. Moreover, the accurate measurement and correction of the troposphere zenith total delay is also very important for studying meteorology and climate, because it provides data of global distribution and dynamic change of water vapor in the atmosphere, which is helpful for the research in the fields of weather prediction, climate simulation and natural disaster monitoring. Therefore, it is very important to establish a high-precision troposphere delay correction model.

The troposphere delay correction model may be divided into two types: one is a model based on meteorological parameters, and the other is a model independent of the meteorological parameters. At present, the widely used models based on actually measured meteorological parameters include a Saastamonien model, a Hopfield model and a Black model. However, these models need to accurately measure the meteorological parameters as input data, which limits their applicability in some cases. At present, a non-meteorological parameter model has become a hot spot of research and use, wherein a global pressure and temperature model (GPT) is widely used, and compared with the previous generation of global pressure and temperature model, a third generation of global pressure and temperature model GPT-3 has been improved in stability and precision.

For an arid scenario, the situation is indeed relatively complicated, because under this circumstance, an atmospheric humidity in the troposphere is very low, which is significantly different from a standard empirical model. Therefore, it is very necessary to correct the troposphere zenith total delay model to meet the needs of arid regions. The GNSS has become a new method to acquire the ZTD because of its high precision and low cost, and ground-based observation data of the GNSS may be used for real-time inversion of troposphere precipitable water vapor (PWV).

SUMMARY

The technical problem of the present disclosure is that an existing troposphere model has low precision and poor reliability in an arid region.

The present disclosure is intended to solve the above problem, and to provide a modeling method of tropospheric delay for arid-areas including sandy, gobi and desert regions based on GNSS, wherein an atmospheric weighted average temperature in a model is corrected by utilizing a troposphere delay actually measured by a regional GNSS station and ERA5 meteorological data, a priori value of a high-precision troposphere zenith wet delay is acquired, and then the priori value of the troposphere zenith wet delay is corrected by utilizing a BiLSTM neural network to obtain a corresponding correction model, so as to establish a high-precision regional troposphere delay model in an arid scenario.

The technical solution of the present disclosure is a modeling method of tropospheric delay for arid-areas including sandy, gobi and desert regions based on GNSS, which includes the following steps of:

step 1: obtaining an atmospheric pressure P, an atmospheric weighted average temperature $T_m$, a water vapor pressure lapse rate $\lambda_m$ and a water vapor pressure e according to a geographical position and time of a station by utilizing a global pressure and temperature model; obtaining a troposphere zenith hydrostatic delay ZHD and a troposphere zenith wet delay ZWD according to meteorological parameters obtained by the global pressure and temperature model, and obtaining a troposphere zenith total delay ZTD by adding the ZHD with the ZWD;

step 2: inversely calculating the ZTD by utilizing a ground-based GNSS, obtaining the troposphere zenith hydrostatic delay ZHD by inputting an air pressure in a fifth generation of atmospheric reanalysis data set of global climate into a Saastamonien model, and obtaining a high-precision troposphere zenith wet delay ZWD inversely calculated according to the GNSS by calculating a difference between the ZTD and the ZHD;

step 3: inversely calculating the atmospheric weighted average temperature $T'_m$ according to a water pressure and a temperature in the fifth generation of atmospheric reanalysis data set of global climate, and obtaining a corrected temperature $T_m^r$ by linearly correcting the $T_m$ calculated by the global pressure and temperature model in the step 1 utilizing the $T'_m$;

step 4: calculating a priori value $ZWD_0$ of the troposphere zenith wet delay utilizing an Askne model according to the $T_m^r$ obtained in the step 3;

step 5: establishing a correction model of troposphere zenith wet delay by utilizing a bidirectional long and short term memory network BiLSTM, taking the priori value $ZWD_0$ of the troposphere zenith wet delay obtained in the step 4 as input data of the correction model, taking the troposphere zenith wet delay ZWD inversely calculated by the GNSS in the step 2 as reference data for a corrected value $ZWD_m$ of the troposphere zenith wet delay which is an output result of the correction model, establishing a training data set of the correction model of troposphere zenith wet delay, and setting a loss function to continuously optimize the BiLSTM; and step 6: calculating a corrected high-precision troposphere zenith total delay ZTD by summing the corrected value $ZWD_m$ of the troposphere zenith wet delay obtained by the correction model of troposphere zenith wet delay in the step 5 and the ZHD calculated by the global pressure and temperature model in the step 1.

Preferably, the global pressure and temperature model is a third generation of global pressure and temperature model GPT-3.

In some embodiments, in the step 1, calculation formulas of the troposphere zenith wet delay ZWD and the troposphere zenith hydrostatic delay ZHD are:

$$ZHD = \frac{0.0022768P}{1 - 0.00266\cos(2\varphi) - 0.00028H};$$

$$ZWD = 10^{-6}(k_1 + k_2/T_m)\frac{R_d}{(\lambda_m + 1)g_m}e;$$

wherein, P represents an air pressure of the station, $\varphi$ represents a latitude of the station, H represents a geodetic height of the station, $k_1$ and $k_2$ are both atmospheric refraction constants, $R_d$ represents a gas constant, $\lambda_m$ is the water vapor pressure lapse rate, $T_m$ is the atmospheric weighted average temperature, e is the water vapor pressure, and $g_m$ is an acceleration of gravity of the station.

In some embodiments, in the step 3, an inversion calculation model for inversely calculating the atmospheric weighted average temperature $T'_m$ according to the water pressure and the temperature in the fifth generation of atmospheric reanalysis data set of global climate in the step 3 is:

$$T_m = \frac{\int_s \frac{p_w}{T} Z_w^{-1} ds}{\int_s \frac{p_w}{T^2} Z_w^{-1} ds} \approx \frac{\int_{h_0}^{\infty} \frac{p_w}{T} dz}{\int_{h_0}^{\infty} \frac{p_w}{T^2} dz};$$

wherein, $p_w$ represents the water vapor pressure, T represents a temperature, z represents a height, $H_0$ represents a height of the station, and s represents a distance from the ground.

In some embodiments, in the step 4, a calculation formula for obtaining the $ZWD_0$ by utilizing the Askne model is:

$$ZWD_0 = 10^{-6}(k_1 + k_2/T_m^r)\frac{R_d}{(\lambda + 1)g_m}e;$$

wherein, $T_m^r$ represents the corrected atmospheric weighted average temperature.

Further, the BiLSTM model is:

$$ZHD = \frac{0.0022768P}{1 - 0.00266\cos(2\varphi) - 0.00028H};$$

wherein, $h_t$ and $h_t'$ respectively represent outputs of a forward layer and a backward layer at a moment t, $o_t$ represents an output of the BiLSTM model at the moment t, f( ) and g( ) both represent activation functions, $w_1$, $w_2$, $w_3$, $w_4$, $w_5$ and $w_6$ are all weight parameters, $h_{t-1}$ and $h_{t+1}$ respectively represent outputs of a previous moment and a next moment, and $X_t$ represents an input of the BiLSTM model at the moment t.

Compared with the prior art, the beneficial effects of the present disclosure include the followings.

1) The technical solution of the present disclosure has the advantages of high precision and quick calculating, the atmospheric weighted average temperature is corrected by utilizing the ERA5 meteorological data to acquire the priori value of the high-precision troposphere zenith wet delay, and then the priori value is corrected by utilizing the value of the troposphere zenith wet delay inversely calculated by the GNSS in the corresponding region, which can fully consider the characteristics of the arid region, thus improving the reliability of the troposphere delay model in an extreme region.

2) According to the present disclosure, the correction model of troposphere zenith wet delay is established by utilizing the bidirectional long and short term memory network BiLSTM, the loss function is set, and the correction model of troposphere zenith wet delay is optimized and trained by utilizing the historical value of the troposphere zenith wet delay inversely calculated by the GNSS and the value of the troposphere zenith wet delay obtained by the Askne model as training data, thus further improving the precision of the troposphere zenith wet delay.

3) The present disclosure does not need additional capital investment, based on an existing GNSS observation station, it is not necessary to establish a new observation station, and it is not necessary to add additional data acquisition equipment either, and the troposphere zenith total delay correction model may be established by data processing and training, so as to obtain the high-precision troposphere zenith total delay.

BRIEF DESCRIPTION OF THE DRAWINGS

The present disclosure is further described hereinafter with reference to the drawings and embodiments.

The FIGURE is a schematic diagram of a modeling method of tropospheric delay for arid-areas including sandy, gobi and desert regions based on GNSS according to an embodiment.

DETAILED DESCRIPTION OF THE EMBODIMENTS

As shown in the FIGURE, a modeling method of tropospheric delay for arid-areas including sandy, gobi and desert regions based on GNSS specifically includes the following steps.

1) An atmospheric pressure P, an atmospheric weighted average temperature $T_m$, a water vapor pressure lapse rate $\lambda_m$ and a water vapor pressure e are obtained according to a geographical position and time of a station by utilizing a GPT-3 model, with a formula as follows:

$$r(P, Tm, \lambda, e) = A_0 + A_1\sin\left(\frac{doy}{365.25}2\pi\right) +$$

$$B_1\cos\left(\frac{doy}{365.25}2\pi\right)+A_2\sin\left(\frac{doy}{365.25}4\pi\right)+B_2\cos\left(\frac{doy}{365.25}4\pi\right)$$

wherein, $A_0$ is an average value of solution by a least square method, $A_1$ and $B_1$ are respectively annual period parameters, $A_2$ and $B_2$ are respectively semi-annual period parameters, doy is a day of year, $\pi$ is Pi, and r( ) represents a function for estimating the meteorological parameters.

The obtained meteorological parameters are calculated by utilizing a Saastamonien model to obtain a troposphere zenith hydrostatic delay ZHD and calculated by utilizing an Askne model to obtain a troposphere zenith wet delay ZWD, and the ZHD and the ZWD are added to obtain a ZTD:

$$ZHD = \frac{0.0022768P}{1-0.00266\cos(2\varphi)-0.00028H};$$

$$ZWD = 10^{-6}(k_1+k_2/T_m)\frac{R_d}{(\lambda_m+1)g_m}e;$$

wherein, P, $\varphi$ and H are respectively an air pressure, a latitude and a geodetic height of the station; $k_1$ and $k_2$ are both atmospheric refraction constants, $R_d$ is a gas constant, $\lambda_m$ is the water vapor pressure lapse rate, $T_m$ is the atmospheric weighted average temperature, e is the water vapor pressure, and $g_m$ is an acceleration of gravity of the station.

A historical value of the ZTD is obtained in combination with historical data, and because a water vapor content in the arid region is very small, there will be a great error between the ZWD of the model and a real value, so that the ZWD is corrected.

2) The ZTD is inversely calculated by utilizing a ground-based GNSS.

The process of GNSS signal propagation may be affected by troposphere refraction, the troposphere delay is usually corrected by parameter estimation, the parameters of the ZTD are estimated by precise point positioning (PPP), and the precision of inversion can reach a millimeter level.

According to a method for inverting the ZTD by the PPP technology, influences caused by a satellite orbit and a clock error are eliminated by utilizing precise satellite orbit and clock error data provided by an IGS. In the process of calculating, the troposphere delay takes part in equation solution as an unknown parameter, its principle is to establish two observation equations according to an ionosphere-free combination of pseudo-range and carrier phase observation equations of the GNSS station, and the observation equations are as follows:

$$P_{IF}=\mu_r^{s,j}r+\delta\hat{t}_r^s+T_r^s+\varepsilon_{r,P}^s;$$

$$L_{IF}=\mu_r^{s,j}r+\delta\hat{t}_r^s+T_r^s+\lambda N_{IF,r}^{s,j}+\varepsilon_{r,L}^s;$$

wherein, $\mu_r^{s,j}=(\alpha,\beta,\gamma)$ is a unit vector of a receiver and a satellite, $r=(\delta x_r,\delta y_r,\delta z_r)$ is a correction vector of coordinate components, $T_r^s$ is the troposphere zenith total delay, $\lambda$ is a carrier wavelength, $N_{IF,r}^{s,j}$ is an ambiguity parameter, $\delta\hat{t}_r^s$ represents a receiver clock error parameter containing a pseudo-range hardware delay, $\varepsilon_{r,P}^s$ represents a pseudo-range-related noise, $\varepsilon_{r,L}^s$ represents a carrier phase-related noise, $P_{IF}$ represents a pseudo-range observation value without an ionospheric combination after error correction, and $L_{IF}$ represents a carrier phase observation value without the ionospheric combination after error correction.

The parameters to be estimated in the observation equations are $X=[r, \delta\hat{t}_r^s, T_r^s, N_{IF,r}^{s,1}, N_{IF,r}^{s,2}, \ldots, N_{IF,r}^{s,m}]^T$, and the observation equations are written in a matrix form:

$$V = BX - L;$$

$$B = \begin{bmatrix} \mu_r^{s,1} & 1 & 1 & 0 & 0 & \cdots & 0 \\ \mu_r^{s,1} & 1 & 1 & \lambda_1 & \lambda_2 & \cdots & \lambda_m \\ \vdots & \vdots & \vdots & \vdots & \vdots & \vdots & \vdots \\ \mu_r^{s,m} & 1 & 1 & 0 & 0 & \cdots & 0 \\ \mu_r^{s,m} & 1 & 1 & \lambda_1 & \lambda_2 & \cdots & \lambda_m \end{bmatrix};$$

$$L = \begin{bmatrix} P_{IF,1}-\rho_1 \\ L_{IF,1}-\rho_1 \\ \vdots \\ P_{IF,m}-\rho_m \\ L_{IF,m}-\rho_m \end{bmatrix};$$

wherein, $\mu_r^{s,1} \ldots \mu_r^{s,m}$ respectively represent observation vectors of different satellites, and $\lambda_1\lambda_2\ldots\lambda_m$ respectively represent carrier wavelengths corresponding to different observation satellites; and $N_{IF,r}^{s,1}, N_{IF,r}^{s,2}, \ldots, N_{IF,r}^{s,m}$ respectively represent integer ambiguity parameters corresponding to different observation satellites, $P_{IF,1} P_{IF,2} \ldots P_{IF,M}$ respectively represent pseudo-range observation values corresponding to different observation satellites, and $L_{IF,1} L_{IF,2} \ldots L_{IF,M}$ respectively represent carrier phase observation values corresponding to different observation satellites. M is a number of observation satellites. V represents a residual matrix. B is a coefficient matrix. L represents an observation value matrix.

$\rho$ is a distance observation value, which is obtained by a least square method:

$$X = (B^T B)^{-1} B^T L;$$

therefore, the troposphere zenith total delay $T_r^s$ may be obtained by calculating.

Because the troposphere delay contains the troposphere zenith hydrostatic delay ZHD and the troposphere zenith wet delay ZWD, $$ZWD = ZTD - ZHD;$$

the ZHD is obtained by inputting an air pressure of an ERA5 data set into a Saastamonien model, and finally, a high-precision ZWD inverted by the GNSS may be obtained.

3) The atmospheric weighted average temperature $T'_m$ is inversely calculated by utilizing a water vapor pressure and a temperature in the ERA5 meteorological data set, as shown in the following formula:

$$T_m = \frac{\int_s \frac{p_w}{T}Z_w^{-1}ds}{\int_s \frac{p_w}{T^2}Z_w^{-1}ds} \approx \frac{\int_{h_0}^{\infty}\frac{p_w}{T}dz}{\int_{h_0}^{\infty}\frac{p_w}{T}dz};$$

wherein, $p_w$ and T respectively represent the water vapor pressure and the temperature, z is a height, s is a distance from the ground, and $H_0$ represents a height of the station. A high-precision atmospheric weighted average temperature may be obtained by utilizing this formula.

The obtained atmospheric weighted average temperatures $T_m$ at different moments are combined into an atmospheric weighted average temperature sequence $T_{m,S}$, $$T_{m,S}=(T_{m,1},T_{m,2},T_{m,3},\ldots,T_{m,i},\ldots,T_{m,n});$$

wherein, $T_{m,i}$, i=1, 2 ... n represents an atmospheric weighted average temperature at an $i^{th}$ moment. n represents a total number of atmospheric weighted average temperature data at different moments.

Because a modeling data source of the GPT-3 model is monthly average data, which only contains annual and semi-annual periodic terms, information of the $T_m$ changing with an elevation cannot be reflected, and the precision is limited.

Linear correction is performed on the atmospheric weighted average temperature $T_m$ obtained by the GPT-3 model through the inversely calculated high-precision $T'_m$, which will take into account an influence of a change of the elevation on a value.

Specifically, a formula for performing the linear correction on the $T_m$ is:

$$T_m^r = aT_m + b;$$

wherein, $T_m^r$ represents the corrected atmospheric weighted average temperature, and a and b are both parameters to be estimated, which are calculated by a least square method.

4) The corrected atmospheric weighted average temperature $T_m^r$ may be obtained by utilizing the formula in the step 3), and a new value of the ZWD is obtained according to the Askne model, which is recorded as $ZWD_0$ and used as a high-precision priori value:

$$ZWD_0 = 10^{-6}(k_1 + k_2/T_m^r)\frac{R_d}{(\lambda+1)g_m}e.$$

5) A correction model of troposphere zenith wet delay is established by utilizing the bidirectional long and short term memory network BiLSTM, the ZWD inversely calculated by the GNSS at a historical moment in the step 2) is taken as high-precision reference data for the correction model of troposphere zenith wet delay, and the $ZWD_0$ obtained in the step 4) is taken as input data of the correction model of troposphere zenith wet delay. The input data of the correction model of troposphere zenith wet delay further include, but are not limited to, a longitude Lon, a latitude Lat, an air pressure P, a temperature T, a height H and other factors of an observation point.

A characteristic sequence matrix $B_f$ is established, $$B_f = \begin{bmatrix} ZWD_{0,1} & Lon_1 & Lat_1 & P_1 & T_1 & H_1 \\ ZWD_{0,2} & Lon_2 & Lat_2 & P_2 & T_2 & H_2 \\ ZWD_{0,3} & Lon_3 & Lat_3 & P_3 & T_3 & H_3 & \ldots \\ \vdots & \vdots & \vdots & \vdots & \vdots & \vdots \\ ZWD_{0,n} & Lon_n & Lat_n & P_n & T_n & H_n \end{bmatrix};$$

wherein, $ZWD_{0,1}$, $ZWD_{0,2}$, ... $ZWD_{0,n}$ respectively represent values of the $ZWD_0$ at $1^{st}$, $2^{nd}$, ... $n^{th}$ moments; $Lon_1$, $Lon_2$, .... $Lon_n$ respectively represent longitudes of the observation point at the $1^{st}$, $2^{nd}$, ... $n^{th}$ moments; $Lat_1$, $Lat_2$, ... $Lat_n$ respectively represent latitudes of the observation point at the $1^{st}$, $2^{nd}$, ... $n^{th}$ moments; $P_1$, $P_2$, ... $P_n$ respectively represent air pressures of the observation point at the $1^{st}$, $2^{nd}$, ... $n^{th}$ moments; $T_1$, $T_2$, ... $T_n$ respectively represent temperatures of the observation point at the $1^{st}$, $2^{nd}$, ... $n^{th}$ moments; and $H_1$, $H_2$, ... $H_n$ respectively represent heights of the observation point at the $1^{st}$, $2^{nd}$, ... $n^{th}$ moments. N represents a total number of observation data.

A data set of the BiLSTM is established according to the ZWD inversely calculated by the GNSS in the step 2) and the $ZWD_0$ obtained in the step 4), which is divided into a training set, a verification set and a testing set.

Because there are too many characteristics, in order to speed up the training efficiency of the model, it is necessary to normalize the input data to ensure the training stability of the neural network.

A correlation degree is calculated by utilizing a partial autocorrelation function PACF to reestablish an input variable of the characteristic sequence. A PACF diagram of each characteristic is analyzed to observe whether there are significant peaks in lag orders of different characteristics. The significant peak indicates that the lag order has a great influence on a current characteristic. These lag orders are considered as important time points related to the current characteristic.

Based on results of the PACE, a characteristic with significant correlation with a target variable is selected. These characteristics are considered to have an important contribution to the establishment of the correction model of troposphere zenith wet delay, and will be incorporated into the correction model, which reduces the subjectivity of artificially setting an input variable of the correction model of troposphere zenith wet delay, thus improving the prediction precision. Meanwhile, a sequence sample is created: time sequence data are divided into fixed-length windows to be used as inputs of the BiLSTM model.

After decorrelation of the characteristic sequence is completed, a weight matrix is initialized randomly, which breaks a symmetry, improves a learning ability of the BiLSTM model for different characteristics, and prevents the problems of gradient explosion and gradient disappearance at the same time.

The BiLSTM model is established, and main expressions of the BiLSTM are as follows:

$$h_t = f(\omega_1 X_t + \omega_2 h_{t-1})$$
$$h'_t = f(\omega_3 X_t + \omega_5 h_{t+1})$$
$$o_t = g(\omega_4 h_t + \omega_6 h'_t);$$

wherein, $X_t$ is an input at a moment t, and $w_1$, $w_2$, $w_3$, $w_4$, $w_5$, $w_6$ are all weight values, which need to be initialized before training. Random initialization refers to randomly generating the weight values within a certain range, and then these values constantly adjusted through training. $h_{t-1}$ is an output at the previous moment, $h_t$ is an output of a forward layer at the moment t, $h^{t+1}$ is an output at the next moment, $h_t'$ is an output of a backward layer at the moment t, and $o_t$ is an output at the moment t. The data are subjected to forward sequence fitting and then subjected to reverse fitting to improve the anti-interference of the data set, so that the correction of the ZWD achieves a better processing effect.

The BiLSTM model mainly involves four super-parameters, which are respectively a number of hidden layers, a number of neurons, a sample size of batching processing and a number of training iterations. These super-parameters will greatly affect the prediction precision of the BiLSTM model, so that it is necessary to optimize the super-parameters during training, so as to ensure that a subsequent prediction effect can reach an expected level.

The corrected value of the troposphere zenith wet delay ZWD is calculated by utilizing the correction model of troposphere zenith wet delay. For the value of the ZWD at the moment T and the value of the ZWD at the moment T, fitting prediction is performed by utilizing the data set at the previous moment T−1, and then the data at the moment T are added into the data set to predict the value of the ZWD at the moment T+1, and all the values of the ZWD of the whole sequence are obtained in sequence. For the value of the ZWD obtained by the BiLSTM model, the loss function is $$LOSS_{bias} = \sum_{i=1}^{N} |ZWD_{m,i} - ZWD_{GNSS,i}|^2;$$

wherein, N is a total number of the ZWD in the time sequence, $ZWD_{m,i}$ is the value of the ZWD calculated by the model at the $i^{th}$ moment, and $ZWD_{GNSS,i}$ is the value of the ZWD inverted by the GNSS at the $i^{th}$ moment.

The parameters are optimized by loss function calculation and back propagation to optimize the parameters of the model, so that the BiLSTM model may adapt to a pattern of the data to improve the precision of the BILSTM model.

A threshold is set to judge the precision of the value of the ZWD, $$\Delta = \sqrt{\frac{\sum_{i=1}^{n}(ZWD_{m,i} - ZWD_{GNSS,i})^2}{n}} < threshold;$$

wherein, threshold represents the threshold, and Δ represents a precision result of calculation.

When the precision requirement is met, the obtained value of the ZWD is denormalized to obtain the final value of the ZWD; and when the precision requirement is not met, the model is trained again.

6) The value of the ZWD in the step 5) is added with the ZHD calculated by the GPT-3 model to obtain the value of the corrected high-precision ZTD, so as to complete the establishment of the troposphere zenith total delay ZTD correction model in the arid region.

$$ZTD_m = ZWD_m + ZHD;$$

wherein, $ZTD_m$ represents the corrected high-precision troposphere zenith total delay, and $ZWD_m$ represents the corrected high-precision troposphere zenith wet delay.

In the embodiment, five IGS stations are selected for a simulation experiment, as shown in Table 1, wherein WIND00NAM, ADIS00ETH, KITG00UZB, URUM00CHN and ALIC00AUS are IGS stations in the arid region selected worldwide, which cover different regions in the northern and southern hemispheres.

According to observation data of the station in March to September 2022, values of a mean absolute error MAE and a root mean square error RMS of the troposphere zenith total delay ZTD calculated by the present disclosure are compared with values of the MAE and the RMS of the troposphere zenith total delay ZTD calculated by the GPT-3 model, as shown in Table 2.

TABLE 1

IGS station distribution table

| Station | Latitude | Longitude | Height |
|---|---|---|---|
| WIND00NAM | 22.6° S | 17.1° E | 1734.7 m |
| ADIS00ETH | 9° N | 38.8° E | 2439.1 m |
| KITG00UZB | 39.1° N | 66.887° E | 620.6 m |
| URUM00CHN | 43.8° N | 87.6° E | 858.9 m |
| ALIC00AUS | 23.6° S | 133.8° E | 603.2 m |

TABLE 2

Error table of values of ZWD of different models

| Station | Month | MAE of the present disclosure | RMS of the present disclosure | MAE of GPT-3 | RMS of GPT-3 |
|---|---|---|---|---|---|
| WIND00NAM | March | 1.14 | 4.23 | 1.16 | 5.08 |
|  | April | 1.75 | 4.57 | 1.97 | 4.92 |
|  | May | 1.54 | 4.13 | 1.78 | 4.45 |
|  | June | 1.15 | 4.39 | 1.17 | 4.81 |
|  | July | 0.81 | 3.89 | 0.91 | 4.31 |
|  | August | 1.5 | 4.05 | 1.61 | 4.83 |
|  | September | 1.5 | 4.63 | 1.56 | 5 |
| ADIS00ETH | March | 1.79 | 4.82 | 1.98 | 5.22 |
|  | April | 1.1 | 4.09 | 1.13 | 4.09 |
|  | May | 1.4 | 4.51 | 1.44 | 4.69 |
|  | June | 1.74 | 4.31 | 1.82 | 4.72 |
|  | July | 1.96 | 4.48 | 2.15 | 5.28 |
|  | August | 1.14 | 4.78 | 1.34 | 5.46 |
|  | September | 0.89 | 4.17 | 1.06 | 4.59 |
| KITG00UZB | March | 1.13 | 3.8 | 1.29 | 4 |
|  | April | 1.61 | 4.82 | 1.63 | 5.61 |
|  | May | 1.97 | 4.71 | 2.17 | 4.72 |
|  | June | 1.62 | 4.5 | 1.83 | 4.54 |
|  | July | 0.68 | 3.38 | 0.73 | 3.78 |
|  | August | 1.08 | 4.28 | 1.15 | 4.66 |
|  | September | 1.98 | 4.15 | 2.07 | 5.08 |
| URUM00CHN | March | 2.11 | 5.06 | 2.23 | 5.66 |
|  | April | 0.88 | 4.42 | 0.96 | 4.78 |
|  | May | 0.97 | 3.89 | 1.12 | 4 |
|  | June | 1.6 | 4.69 | 1.68 | 5.28 |
|  | July | 1.18 | 4.44 | 1.21 | 5.28 |
|  | August | 0.94 | 3.77 | 1.01 | 4.24 |
|  | September | 1.19 | 3.91 | 1.31 | 4.71 |
| ALIC00AUS | March | 1.47 | 4.6 | 1.52 | 5.08 |
|  | April | 1.71 | 4.59 | 1.92 | 5.16 |
|  | May | 1.58 | 4.55 | 1.73 | 5.2 |
|  | June | 1.77 | 5.04 | 1.9 | 5.77 |
|  | July | 1.37 | 4.54 | 1.38 | 4.84 |
|  | August | 1.08 | 4.41 | 1.28 | 4.84 |
|  | September | 1.24 | 4.36 | 1.48 | 4.62 |

By comparing the values of the MAE and the RMS of the troposphere zenith total delay ZTD obtained by the present disclosure with the values of the MAE and the RMS of the troposphere zenith total delay ZTD obtained by the GPT-3 model, the precision of the ZTD correction model of the present disclosure is improved to some extent, and a modeling effect in an arid scenario is better.

According to the present disclosure, the GPT-3 troposphere delay model is corrected by utilizing high-precision GNSS data and ERA5 meteorological data, the $T_m$ value is fitted first to obtain the high-precision priori ZWD, and then the ZWD is corrected by utilizing the BiLSTM model in combination with the ZWD inversely calculated by the GNSS to obtain a high-precision regional troposphere delay model.

The invention claimed is:

1. A modeling method of tropospheric delay for arid-areas including sandy, gobi and desert regions based on GNSS, comprising:

step 1: obtaining an atmospheric pressure P, an atmospheric weighted average temperature Tm, a water vapor pressure lapse rate λm and a water vapor pressure e according to a geographical position and time of a station by utilizing a global pressure and temperature model; obtaining a troposphere zenith hydrostatic delay ZHD and a troposphere zenith wet delay ZWD according to meteorological parameters obtained by the global pressure and temperature model, and obtaining a troposphere zenith total delay ZTD by adding the ZHD with the ZWD;

step 2: inversely calculating the ZTD by utilizing a ground-based GNSS, obtaining the troposphere zenith hydrostatic delay ZHD by inputting an air pressure in a fifth generation of atmospheric reanalysis data set of global climate into a Saastamonien model, and obtaining a troposphere zenith wet delay ZWD inversely calculated according to the GNSS by calculating a difference between the ZTD and the ZHD;

step 3: inversely calculating the atmospheric weighted average temperature T'm according to a water pressure and a temperature in the fifth generation of atmospheric reanalysis data set of global climate, and obtaining a corrected temperature $T_m{}^r$ by linearly correcting the Tm calculated by the global pressure and temperature model in the step 1 utilizing the T'm;

step 4: calculating a priori value ZWD0 of the troposphere zenith wet delay utilizing an Askne model according to the $T_m{}^r$ obtained in the step 3;

step 5: establishing a correction model of troposphere zenith wet delay by utilizing a bidirectional long and short term memory network BiLSTM, taking the priori value ZWD0 of the troposphere zenith wet delay obtained in the step 4 as input data of the correction model, taking the troposphere zenith wet delay ZWD inversely calculated by the GNSS in the step 2 as reference data for a corrected value ZWDm of the troposphere zenith wet delay which is an output result of the correction model, establishing a training data set of the correction model of troposphere zenith wet delay, and setting a loss function to continuously optimize the BiLSTM; and step 6: completing establishment of the troposphere zenith total delay ZTD correction model in the arid region and calculating a corrected troposphere zenith total delay ZTD by summing the corrected value ZWDm of the troposphere zenith wet delay obtained by the correction model of troposphere zenith wet delay in the step 5 and the ZHD calculated by the global pressure and temperature model in the step 1;

selecting multiple IGS stations in the arid region, which cover different regions in the northern and southern hemispheres;

calculating values of a mean absolute error MAE and a root mean square error RMS of the troposphere zenith total delay ZTD of the IGS stations according to the corrected troposphere zenith total delay ZTD;

wherein the global pressure and temperature model is used for:

calculating the atmospheric pressure P, the atmospheric weighted average temperature Tm, the water vapor pressure lapse rate $\lambda_m$ and the water vapor pressure e according to the geographical position and the time of the station, $$r(P, Tm, \lambda_m, e) = A_0 + A_1\sin\left(\frac{doy}{365.25}2\pi\right) + B_1\cos\left(\frac{doy}{365.25}2\pi\right) + A_2\sin\left(\frac{doy}{365.25}4\pi\right) + B_2\cos\left(\frac{doy}{365.25}4\pi\right)$$

wherein, $A_0$ is a average value calculated by a least square method, $A_1$ and $B_1$ are both annual period parameters, $A_2$ and $B_2$ are both semi-annual period parameters, doy is a day of year, π is Pi, and r( ) represents a function for estimating the meteorological parameters, wherein calculation formulas of the troposphere zenith wet delay ZWD and the troposphere zenith hydrostatic delay ZHD in the step 1 are:

$$ZHD = \frac{0.0022768P}{1 - 0.00266\cos(2\varphi) - 0.00028H};$$

$$ZWD = 10^{-6}(k_1 + k_2/T_m)\frac{R_d}{(\lambda_m + 1)g_m}e;$$

wherein, P represents an air pressure of the station, φ represents a latitude of the station, H represents a geodetic height of the station, k1 and k2 are both atmospheric refraction constants, Rd represents a gas constant, $\lambda_m$ is the water vapor pressure lapse rate, $T_m$ is the atmospheric weighted average temperature, e is the water vapor pressure, and $g_m$ is an acceleration of gravity of the station, wherein an observation equation of the GNSS according to the inversely calculating the ZTD by the ground-based GNSS in the step 2 is:

$$P_{IF} = \mu_r^{s,j}r + \delta\hat{t}_r^s + T_r^s + \varepsilon_{r,P}^s;$$

$$L_{IF} = \mu_r^{s,j}r + \delta\hat{t}_r^s + T_r^s + \lambda N_{IF,r}^{s,j} + \varepsilon_{r,L}^s;$$

wherein, $\mu_r^{s,j} = (\alpha, \beta, \gamma)$ is a unit vector of a receiver and a satellite, $r = (\delta x_r, \delta y_r, \delta z_r)$ is a correction vector of coordinate components, $T_r^s$ is the troposphere zenith total delay, λ is a carrier wavelength, $N_{IF,r}^{s,j}$ is an ambiguity parameter, $\delta\hat{t}_r^s$ represents a receiver clock error parameter containing a pseudo-range hardware delay, $\varepsilon_{r,P}^s$ represents a pseudo-range-related noise, $\varepsilon_{r,L}^s$ represents a carrier phase-related noise, $P_{IF}$ represents a pseudo-range observation value without an ionospheric combination after error correction, and $L_{IF}$ represents a carrier phase observation value without the ionospheric combination after error correction, wherein an inversion calculation model for inversely calculating the atmospheric weighted average temperature T'm according to the water pressure and the temperature in the fifth generation of atmospheric reanalysis data set of global climate in the step 3 is:

$$T'_m = \frac{\int_S \frac{p_w}{T} Z_w^{-1} ds}{\int_S \frac{p_w}{T^2} Z_w^{-1} ds} \approx \frac{\int_{H_0}^{\infty} \frac{p_w}{T} dz}{\int_{H_0}^{\infty} \frac{p_w}{T^2} dz};$$

wherein, $P_w$ represents the water vapor pressure, T represents a temperature, z represents a height, Zw represents a water vapor compression coefficient, H0 represents a height of the station, and s represents a distance from the ground, wherein, in the step 3, a calculation formula for linearly correcting the Tm calculated by the global pressure and temperature model in the step 1 utilizing the T'm is:

$$T_m^r = aT_m + b$$

wherein, a represents a proportional coefficient, b represents a constant parameter, $T_m^r$ represents a corrected atmospheric weighted average temperature, and Tm represents the atmospheric weighted average temperature calculated by the global pressure and temperature model, wherein, in the step 4, a calculation formula for obtaining the ZWD0 by utilizing the Askne model is:

$$ZWD_0 = 10^{-6}(k_1 + k_2/T_m^r) \frac{R_d}{(\lambda+1)g_m} e;$$

wherein, $T_m^r$ represents the corrected atmospheric weighted average temperature, k1 and k2 are both atmospheric refraction constants, Rd represents a gas constant, $\lambda_m$ is the water vapor pressure lapse rate, $T_m$ is the atmospheric weighted average temperature, e is the water vapor pressure, and $g_m$ is an acceleration of gravity of the station, wherein, in the step 5, the BiLSTM model is:

$$h_t = f(w_1 X_t + w_2 h_{t-1})$$
$$h'_t = f(w_3 X_t + w_5 h_{t+1})$$
$$o_t = g(w_4 h_t + w_6 h_t);$$

wherein, $h_t$ and $h_t'$ respectively represent outputs of a forward layer and a backward layer at a moment $O_t$, Of represents an output of the BiLSTM model at the moment t, f( ) and g( ) both represent activation functions, w1, w2, w3, w4, w5 and w6 are all weight parameters, $h_{t-1}$ and $h_{t+1}$ respectively represent outputs of a previous moment and a next moment, and $X_t$ represents an input of the BiLSTM model at the moment t, wherein, in the step 5, the loss function of the BiLSTM model is:

$$LOSS_{bias} = \sum_{i=1}^{N} |ZWD_{m,i} - ZWD_{GNSS,i}|^2;$$

wherein, $ZWD_{m,i}$ represents a value of the ZWD calculated by the model at an ith moment, $ZWD_{GNSS,t}$ represents a value of the ZWD inverted by the GNSS at the ith moment, N represents a total number of samples, i represents a moment, and $LOSS_{bias}$ represents a value of the loss function.

2. The modeling method of tropospheric delay for arid-areas including sandy, gobi and desert regions based on GNSS according to claim 1, wherein a threshold is set to judge the precision of the troposphere zenith wet delay ZWD output by the BiLSTM model, $$\Delta = \sqrt{\frac{\sum_{i=1}^{n}(ZWD_{m,i} - ZWD_{GNSS,i})^2}{n}} < \text{threshold};$$

wherein, threshold represents the threshold, and $\Delta$ represents a precision result of calculation.

* * * * *